United States Patent [19]
Dera et al.

[11] 3,869,163

[45] Mar. 4, 1975

[54] HYDRAULIC SHOCK-ABSORBING BUMPERS

[75] Inventors: Alain Dera; Daniel Besseau, both of Billancourt, France

[73] Assignees: Regie Nationale des Usines Renault, Billancourt; Automobiles Peugeot, Paris, both of, France

[22] Filed: Mar. 23, 1973

[21] Appl. No.: 344,209

[30] Foreign Application Priority Data
Mar. 27, 1972 France.............................. 72.10635

[52] U.S. Cl........................ 293/63, 293/84, 293/85, 293/88, 293/89, 293/96, 293/99
[51] Int. Cl....... B60r 19/06, B61f 19/04, F16f 5/00
[58] Field of Search.......... 267/35, 139; 293/63, 88, 293/89, 85, 84, 96, 99

[56] References Cited
UNITED STATES PATENTS
| | | | |
|---|---|---|---|
| 2,026,113 | 12/1935 | Williams........................... | 293/89 X |
| 2,031,349 | 2/1936 | Williams.............................. | 293/89 |
| 2,873,994 | 2/1959 | Omps................................ | 293/89 X |
| 2,954,256 | 9/1960 | Barenyi............................. | 293/88 X |
| 3,070,363 | 12/1962 | Ellis, Jr.............................. | 267/35 X |
| 3,738,696 | 6/1973 | McLauchlan...................... | 293/89 X |
| 3,797,818 | 3/1974 | Willich et al......................... | 293/85 |

*Primary Examiner*—Lloyd L. King
*Assistant Examiner*—Howard Beltran
*Attorney, Agent, or Firm*—Stevens, Davis, Miller & Mosher

[57] ABSTRACT

This energy-absorbing bumper structure for automotive vehicles is of the type wherein the bumper is pivotally connected to the vehicle chassis through a pair of hydraulic cylinder units. In this structure, the ends of the bumpers are guided along the chassis by resilient means permitting a reversible movement of predetermined amplitude, and the chassis is provided with means preventing the transverse movement of the cylinders with respect thereto when said movement is caused by impact forces.

21 Claims, 15 Drawing Figures

HYDRAULIC SHOCK-ABSORBING BUMPERS

This invention relates to the structure of a shock-absorbing bumper for motor vehicles.

It is already known to construct power- or shock-absorbing bumpers comprising a bumper or like bar structure connected to the vehicle chassis or frame structure through means such as shock-absorbers, breakable elements, etc. The interposition of these devices impart to the assembly shock- or power-absorbing properties far better than those resulting from a direct mounting of the bumper to the chassis. However, said properties vary considerably according to the position and the angle of incidence of the shock with respect to the longitudinal center line of the vehicle. Thus, if we consider a shock of a given intensity or force adapted to be absorbed frontally by the central portion of the bumper, it will be seen that the absorption capacity of the device decreases very rapidly from this portion to the lateral ends.

Experience teaches that specifically at a distance corresponding substantially to one-third of the length measured from the middle point to one end of the bumper, on one or the other side, the capacity of absorbing a shock is only one-half that observed at the center, and that at the very end of the bumper the force absorbable by the device is only one-fourth of its optimum value.

It is the essential object of the present invention to provide a shock- or power-absorbing bumper structure or like device consisting of a bumper connected to the chassis of a motor vehicle through two or more hydraulic shock absorbers and capable of reducing considerably the inconveniences disclosed hereinabove. More particularly, with this shock absorbing bumper structure the diagram curve obtained by measuring the decrease in the shock-absorbing property as a function of the distance from the center to the sides of the bumper is improved considerably. The slope of this curve is such that the reduction by one-half of the capacity of absorbing frontal incident shocks, which was heretofore observed at about one-third of the distance from the center to one end of the bumper, is measured at this end with the device of the present invention.

The power absorbing bumper structure according to this invention, of the type wherein the bumper proper is connected to the vehicle through a pair of hydraulic cylinder units shock absorbers, is characterised essentially in that the ends of this bumper are attached to the vehicle through the medium of resilient means permitting a reversible movement of predetermined amplitude and that the hydraulic cylinder units are provided with means preventing, when necessary, their operation.

A clearer understanding of the present invention will be had as the following description proceeds with reference to the accompanying drawings, in which.

Figure 3:
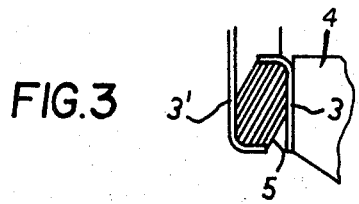
Figure 4:
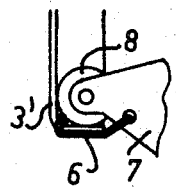
Figure 5:
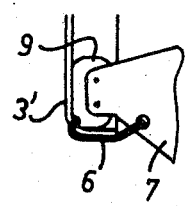
Figure 5A:
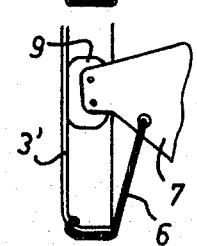

FIGS. 3 to 5 inclusive illustrate details of modified forms of embodiment of one element of the shock-absorbing structure in its inoperative position;

FIGS. 3A to 5A inclusive correspond respectively to FIGS. 3 to 5 and illustrate details of the modified forms of embodiment of one element of the shock-absorbing structure in its stressed position.

Figure 6:
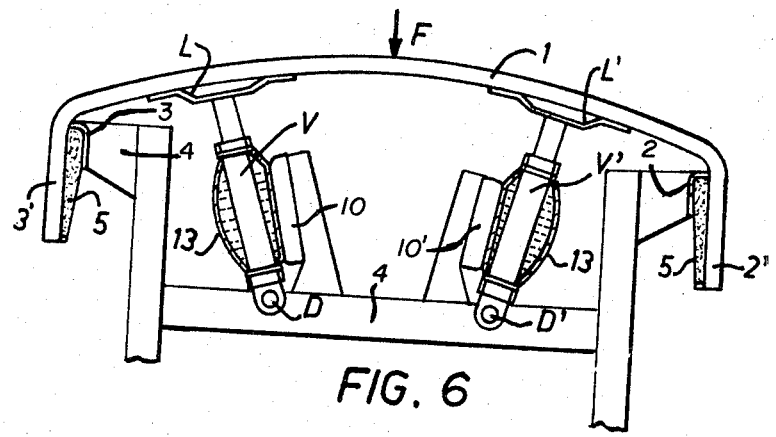
Figure 7:
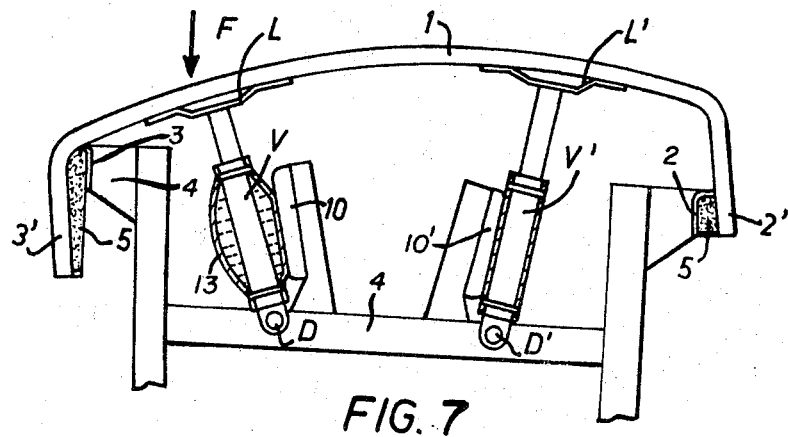
Figure 8:
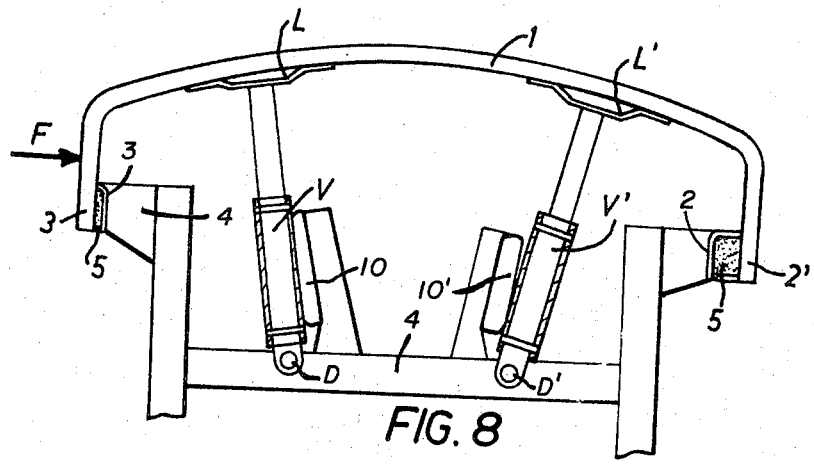

FIGS. 6 to 8 inclusive illustrate three different conditions of the instant structure which are obtained according to the position and the angle of incidence of the shocks applied thereto, and FIGS. 9 to 12 inclusive are diagrammatic illustrations of two different forms of embodiment of the absorber structure in their inoperative and operative conditions, respectively.

Figure 1:
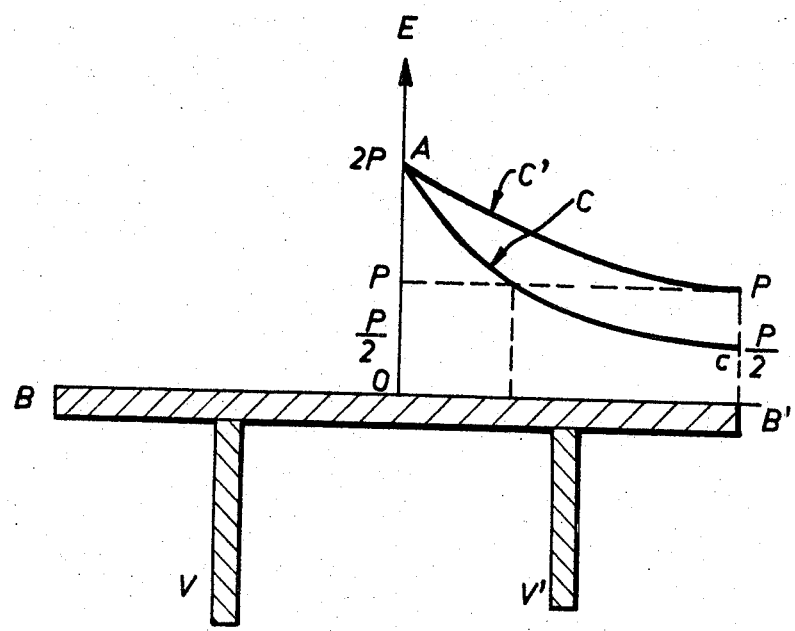
FIG. 1 is a diagram plotting the amount of absorbed energy as a function of the position of the impact point along the bumper, in the structure of this invention (curve C') and in a conventional structure (curve C), respectively.

Referring first to FIG. 1, it will be seen that the bumper B, B' is connected to the chassis or body of a motor vehicle through a pair of hydraulic cylinder units, V, V', the reference letter O designating the center of this bumper. The curves C, C' corresponding to the incident energies likely to be absorbed as a function of the point of impact along one-half of the bumper (for instance OB'), respectively, when this bumper is of conventional design or type (curve C) and when a bumper structure according to this invention is concerned (curve C'). The quantity of incident energy adapted to be absorbed without any distortion of the vehicle concerned at the center O of the bumper is denoted 2P. It will be seen that as it approaches the end B' the curve C' corresponding to the device of this invention attains a minimum value =P. In contrast thereto, in the curve C plotted for a device according to the prior art this value is attained at about only one-third of the distance OB', with a minimum equal to P/2.

Figure 2:
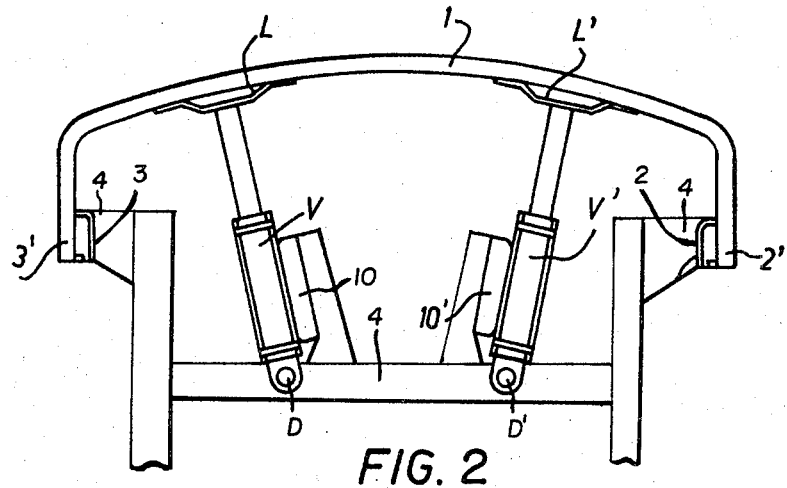
FIG. 2 illustrates a typical form of embodiment of the structure of the present invention.

FIG. 2 illustrates an embodiment of the invention wherein 1 is the bumper proper connected to the vehicle body or chassis through a pair of hydraulic cylinder units V, V'. The ends 2', 3' of the bumper are curved rearwards and resiliently assembled with abutment members 2,3 rigidly fixed on the chassis 4.

Figure 3A:
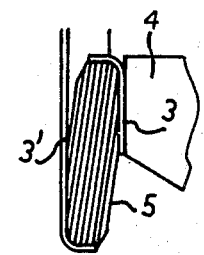

FIGS. 3 and 3A illustrate in detail a typical arrangement of this resilient mounting wherein a rubber pad 5 is cemented on the one hand to the ends 2', 3' of the bumper 1 and on the other hand to the fixed elements 2, 3 rigid with the chassis 4. In FIG. 3, these elements are shown in their inoperative position, and in FIG. 3A these elements are shown in their mutually stressed condition. A side shock is attended by a skew position of the bumper as a consequence of the compression of one of the hydraulic cylinder units V, V' and on the corresponding side 2', 3' by an extension of the resilient blocks 5 whereas on the opposite side the bumper remains stationary and thus partakes in the absorption of the torsion stress. This condition is illustrated in FIG. 7, and a completely frontal shock and a completely lateral shock F are shown in FIGS. 6 and 8, respectively.

Figure 4A:
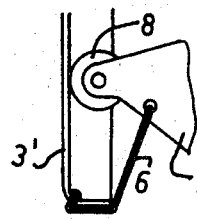

The rubber blocks 5 may be replaced by rubber strips 6 attached on the one end to a fixed element of the chassis 7 which terminates with a roller 8 (FIG. 4A), or a stop member 9 (FIG. 5A), and on the other end to the end 3' of the bumper which is shaped to a slideway configuration to constitute a race for said elements 8, 9, as shown in figures and, in the inoperative (FIGS. 4 and 5) and stressed (FIGS. 4A and 5A) conditions, respectively.

Referring more particularly to FIGS. 2 and 6 to 8, it will be seen that the hydraulic cylinder units V, V' must be capable of assuming different angular positions according to the direction of the shock applied to the bumper; therefore, they are pivotally mounted to pivot pins D, D' carried by the chassis 4 and attached to the bumper by means of flexible blades L, L'. On the other hand, in case of lateral shock as illustrated in FIG. 7 it is necessary that one cylinder unit (V, in this case) can operate while the other cylinder unit (V') remains locked against any compressive effort. This requirement is met by virtue of the arrangement shown in detail in FIGS. 7 and 9 to 11.

Figure 9:
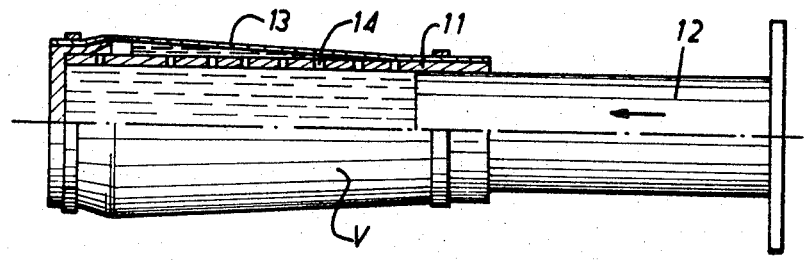
Figure 10:
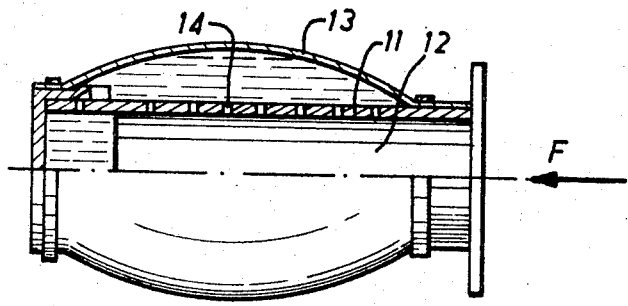
Figure 11:
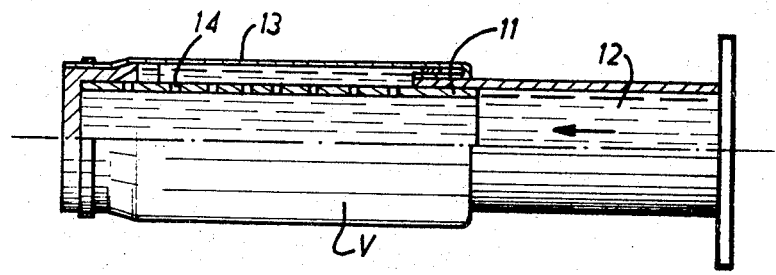
Figure 12:
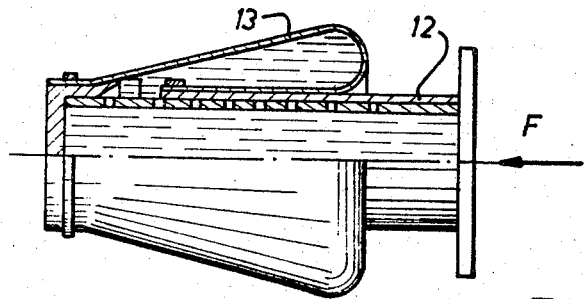

A hydraulic Cylinder unit V or V' comprises essentially a cylinder proper 11 formed with orifices 14 disposed along one of its generatrices and has slidably fitted therein a piston 12 (FIGS. 9, 10). Alternatively, this piston may be slidably mounted to the outer surface of the cylinder 11 (FIGS. 11, 12). A resilient sheath 13 surrounds completely the cylinder. It will be seen that when a thrust or shock is applied to the piston 12 the front face thereof causes the hydraulic fluid to be forced through the orifices 14 into the chamber formed by the sheath 13, inasmuch as these orifices are not closed.

The greater the number of orifices left free (i.e., at the beginning of the piston stroke), the easier the fluid flow from the cylinder to the sheath.

On the other hand, as the piston 12 is driven inwards of the cylinder (inside or outside) and the number of orifices 14 closed thereby increases, the greater the difficulty of transferring this fluid from the cylinder to the sheath.

Referring now to FIGS. 6 and 7, the structure shown therein is characterised by the provision of fixed buffer blocks 10, 10' for example of rubber. The perforated area of the cylinder along a generatrix thereof is so directed that these orifices 14 register with the buffer blocks 10, 10'; however, these blocks are spaced sufficiently from the corresponding cylinder to prevent the diaphragm-forming sheath 13 from being pressed against said orifices 14.

Thus, in case of a central frontal shock, the cylinder can operate normally, as illustrated in FIGS. 10 and 12, since the hydraulic fluid can flow out from the cylinder 11 into the reservoir-forming sheath 13.

However, in case of lateral frontal shock (FIG. 7) a torque develops and imparts a slight rotational movement to the bumper, thus causing the longitudinal axes of cylinder units V, V' to pivot about their axes D, D'. During this movement, the cylinder unit V moves away from rubber buffer block 10, thus permitting the escape of fluid from cylinder 11 to sheath 13, the other cylinder unit V' being in contrast thereto pressed against the block 10' across the orifices 14 of this cylinder. The fluid cannot escape from the cylinder and counteracts the movement of the corresponding piston towards the bottom of the cylinder. Thus, the bumper 1 can safely and firmly be held by its end opposite to that hit during the shock, by the assembly 2, 5, 2' and the cylinder V', so that the assembly will display considerably improved shock-absorbing capacity, as clearly illustrated by the curves of FIG. 1.

Although the present invention has been described and illustrated with specific reference to different forms of embodiment thereof, it will readily occur to those skilled in the art that various modifications and changes may be brought thereto without departing from the scope of the invention as set forth in the appended claims.

What we claim is:

1. A power absorbing bumper for automobile vehicles having a longitudinal axis, said bumper comprising:
    a bumper bar,
    a pair of hydraulic cylinder units pivotally connecting said bumper bar to the vehicle chassis and extending longitudinally between the latter and two intermediate symmetrical points of the bumper relative to said longitudinal axis,
    said bumper bar having curved ends extending longitudinally,
    resilient means connecting each curved end to said vehicle chassis so as to permit a longitudinal reversible displacement of each end; and
    for each cylinder unit, means for resisting the movement of said cylinder unit in response to a transverse displacement of the bumper bar caused by impact forces, said displacement being in a transverse direction from said cylinder unit toward the other cylinder unit.

2. A bumper as claimed in claim 1, in which said resilient means are deformable.

3. A bumper as claimed in claim 1, in which the ends of said bumper bar have their inner faces shaped to a race configuration for engagement by a roller mounted on an adjacent portion of said vehicle chassis and connected to the adjacent end of said bumper bar through a resilient strip.

4. A bumper as claimed in claim 1, in which:
    said cylinder units each comprise:
    a piston rigidly fixed to a spring blade fast with said bumper bar,
    a cylinder in which said piston is slidably mounted, said cylinder having a plurality of orifices formed along a generatrix of said cylinder wall, and
    a resilient sheath surrounding said cylinder and adapted to form a reservoir for collecting the hydraulic fluid discharged from said cylinder during the inward stroke of said piston into said cylinder;
    and means for pivotally connecting each of said cylinders to said vehicle chassis.

5. A bumper as claimed in claim 4, and said resisting means comprises a buffer block of flexible material mounted adjacent said cylinder unit and registrable with said cylinder orifices, said blocks being adapted to be engaged by said cylinder when the impact forces have a component extending longitudinally of the unit in a general direction from the bumper bar to the chassis, so as to cause closure of said orifices by said sheath, thereby preventing discharge of hydraulic fluid from said cylinder and counteracting the operation of said cylinder unit.

6. The bumper as claimed in claim 1, wherein said resisting means comprises a buffer block of flexible material mounted adjacent said cylinder unit.

7. The bumper as claimed in claim 6, wherein said block is mounted inboard of its respective cylinder unit.

8. The bumper as claimed in claim 1, wherein each of said cylinder units comprises a piston rigidly fixed to a spring blade fast with said bumper bar, and a cylinder in which said piston is slidably mounted.

9. The bumper as claimed in claim 1, wherein each of said cylinder units is rigidly fixed to a spring blade fast with said bumper bar.

10. The bumper as claimed in claim 1 wherein:
    said resilient means comprises rubber blocks.

11. The bumper as claimed in claim 1 wherein the pair of hydraulic cylinder units pivotally resiliently connects said bumper bar to the vehicle chassis.

12. A power absorbing bumper for automobile vehicles having a longitudinal axis, said bumper comprising:
a bumper bar,
a pair of hydraulic cylinder units pivotally connecting said bumper bar to the vehicle chassis and extending longitudinally between the latter and two intermediate symmetrical points of the bumper bar relative to said longitudinal axis, each of said units being transversely expandable in response to impact forces having a component extending longitudinally of the unit in a general direction from the bumper bar to the chassis,
said bumper bar having curved ends extending longitudinally,
resilient means connecting each curved end to said vehicle chassis so as to permit a longitudinal reversible displacement of each end; and
for each cylinder unit, means for resisting the operation of said cylinder unit in response to a transverse displacement of the bumper bar caused by the impact forces, said displacement being in a transverse direction from said cylinder unit toward the other cylinder unit.

13. A bumper as claimed in claim 12, in which said resilient means are deformable.

14. A bumper as claimed in claim 12 in which the ends of said bumper bar have their inner faces shaped to a race configuration for engagement by a roller mounted on an adjacent portion of said vehicle chassis and connected to the adjacent end of said bumper bar through a resilient strip.

15. A bumper as claimed in claim 12 in which:
said cylinder units each comprise:
a piston rigidly fixed to a spring blade fast with said bumper bar,
a cylinder in which said piston is slidably mounted,
said cylinder having a plurality of orifices formed along a generatrix of said cylinder wall, and
a resilient sheath surrounding said cylinder, said sheath being expandable in response to the impace forces and adapted to form a reservoir for collecting the hydraulic fluid discharged from said cylinder during the inward stroke of said piston into said cylinder, and
means for pivotally connecting each of said cylinders to said vehicle chassis.

16. A bumper as claimed in claim 15 wherein:
said resisting means comprises a buffer block of flexible material mounted adjacent said cylinder unit and registrable with said cylinder orifices, said blocks being adapted to be engaged by said cylinder in response to the impact forces so as to cause closure of said orifices by said sheath, thereby preventing discharge of hydraulic fluid from said cylinder and counteracting the operation of said cylinder unit.

17. The bumper as claimed in claim 12 wherein:
said resisting means comprises a buffer block of flexible material mounted adjacent said cylinder unit.

18. The bumper as claimed in claim 17 wherein:
said block is mounted inboard of its respective cylinder unit.

19. The bumper as claimed in claim 12 wherein:
each of said cylinder units comprises a piston rigidly fixed to a spring blade fast with said bumper bar, and a cylinder in which said piston is slidably mounted.

20. The bumper as claimed in claim 12 wherein:
each of said cylinder units is rigidly fixed to a spring blade fast with said bumper bar.

21. The bumper as claimed in claim 12 wherein:
the pair of hydraulic cylinder units pivotally resiliently connect said bumper bar to the vehicle chassis.

* * * * *